United States Patent [19]
Klimczak

[11] Patent Number: 4,578,092
[45] Date of Patent: Mar. 25, 1986

[54] METHOD AND APPARATUS FOR IMPROVING THE OPERATION OF A DUST COLLECTOR

[75] Inventor: William J. Klimczak, Racine, Wis.

[73] Assignee: Wehr Corporation, Milwaukee, Wis.

[21] Appl. No.: 548,911

[22] Filed: Nov. 4, 1983

[51] Int. Cl.⁴ .............................................. B01D 46/04
[52] U.S. Cl. ....................................................... 55/302
[58] Field of Search ................... 55/96, 292, 302, 301, 55/382, 303

[56] References Cited

U.S. PATENT DOCUMENTS

| | | | |
|---|---|---|---|
| 3,436,899 | 4/1969 | Pausch | 55/302 |
| 3,535,852 | 10/1970 | Hirs | 55/302 |
| 3,726,066 | 4/1973 | Colley et al. | 55/302 |
| 3,816,978 | 6/1974 | O'Dell | 55/302 |
| 4,073,632 | 2/1978 | Reinauer et al. | 55/302 |
| 4,209,310 | 6/1980 | Berkhoel | 55/302 |
| 4,270,935 | 6/1981 | Reinauer | 55/302 |
| 4,278,454 | 7/1981 | Nemisi | 55/302 |
| 4,319,897 | 3/1982 | Labadie | 55/302 |
| 4,356,010 | 10/1982 | Riemsloh | 55/302 |
| 4,357,151 | 11/1982 | Helfritch et al. | 55/96 |

FOREIGN PATENT DOCUMENTS 2529464 1/1977 Fed. Rep. of Germany ........ 55/292

*Primary Examiner*—Bernard Nozick

[57] ABSTRACT

The invention provides a dust collector for use in air pollution control which includes at least one hollow filter assembly disposed in a hopper and having an open upper end registering with a wall opening. The filter apparatus also includes a nozzle spaced above the filter assembly for selectively directing a reverse pulse of air into the open upper end of the filter such that the reverse air pulse enters the filter assembly and flows through the filter medium in the reverse of the direction of contaminated airflow to thereby remove accumulated contaminants from the filter medium. The dust collector further includes a sleeve positioned inside the hollow filter assembly with the outer surface of the sleeve adjacent the filter medium, the upper end of the sleeve registering with the wall opening and the lower end of the sleeve opening into the filter assembly.

5 Claims, 4 Drawing Figures

U.S. Patent  Mar. 25, 1986  Sheet 1 of 2  4,578,092
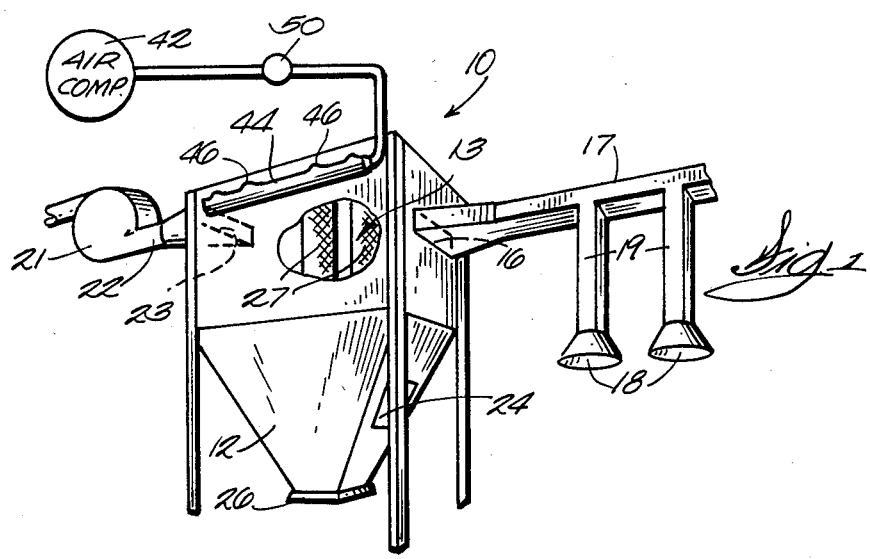
Fig. 1
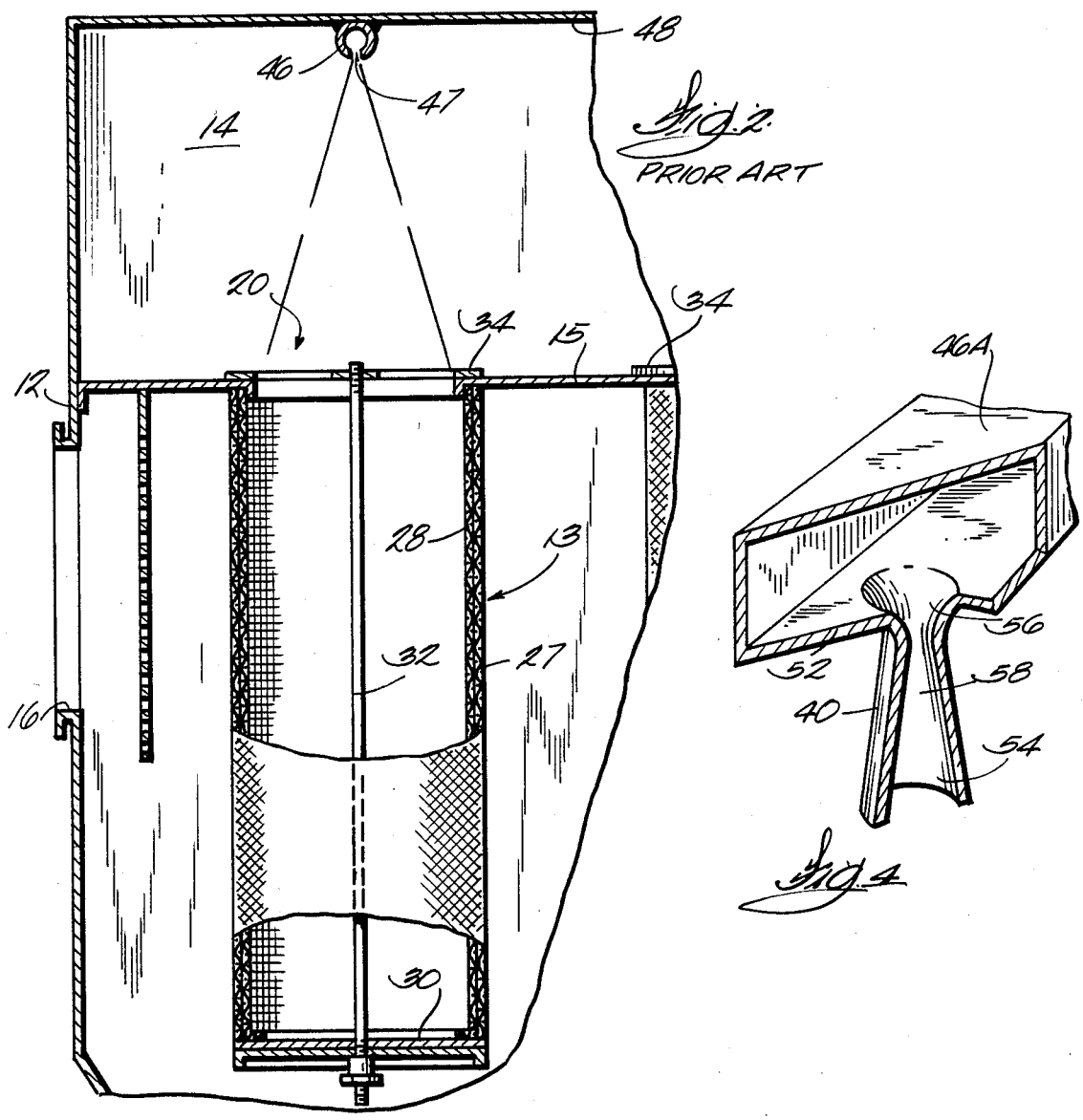
Fig. 2
PRIOR ART
Fig. 4

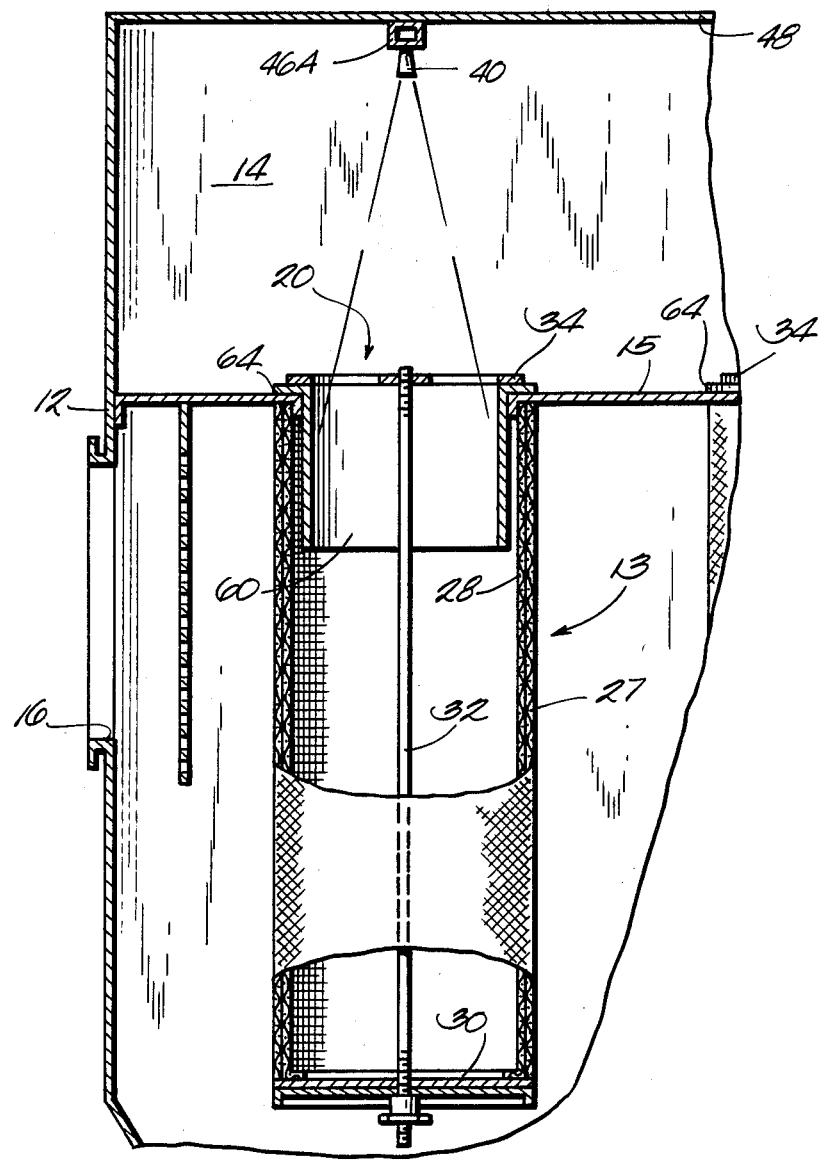

METHOD AND APPARATUS FOR IMPROVING THE OPERATION OF A DUST COLLECTOR

FIELD OF THE INVENTION

This invention relates to air pollution control equipment such as fabric filter dust collectors and more particularly to such apparatus as utilize a reverse stream of compressed air to periodically clean the filter medium in dust collector systems.

BACKGROUND PRIOR ART

In a particular class of air filter apparatus commonly referred to as dust collector systems, it is known to utilize a reverse pulse of compressed air to clean contaminants which have accumulated on the surface of the filter medium. The fabric in a fabric filter dust collector serves essentially as a seive. It acts to retain the dust on one side from passing through to the other side. As a layer of dust builds on the surface of the fabric and as this process continues, increased amounts of energy are required to force the air through the fabric filter. Accordingly, it is desirable to periodically remove the build-up of cake material which collects on the outer surface of the fabric filter.

Various arrangements have been proposed to achieve that cleaning. An example of one such prior art fabric filter dust collector is described in the Pausch U.S. Pat. No. 3,436,899. That patent describes a prior art mechanism employed in an attempt to use supersonic air pulses to clean the fabric filter tubes of the dust collectors.

Attention is also directed to the Pausch U.S. Pat. No. 4,026,682; the Duyckinck U.S. Pat. No. 3,942,962; the Pausch U.S. Pat. No. 3,798,878; and the Pausch U.S. Pat. No. 3,765,152. Attention is further directed to the Pausch U.S. Pat. No. 3,535,867; the Miller U.S. Pat. No. 4,042,356; the Lelaiert et al. U.S. Pat. No. 3,606,736 and the Lelaiert U.S. Pat. No. 3,853,509.

Attention is further directed to the Colley et al. U.S. Pat. No. 3,726,066; the Blackmore U.S. Pat. No. 3,626,674; the Pausch U.S. Pat. No. 3,499,268; the Samolis U.S. Pat. No. 4,097,255; the Nemesi U.S. Pat. No. 4,278,454; and Nemesi pending application Ser. No. 281,962, filed July 10, 1981 now abandoned.

SUMMARY OF THE INVENTION

The present invention provides an improved arrangement for discharging a dust cake from the external surface of the filter medium or fabric bags of a dust collector. More particularly, the present invention provides a means for cleaning the entire length of the elongated filter of the dust collector while employing a minimum amount of energy. By improving the cleaning of the filters, the filters existing in the dust collector are more efficient in filtering the air, and accordingly, the dust collector can employ fewer filters and have a smaller size than prior art dust collectors having the same capacity. Additionally, the means for facilitating cleaning of the dust cakes from the filters is energy efficient in that it employs a minimum amount of compressed air to effect cleaning of the filters, thereby permitting the employment of a smaller air pump or air compresser and the employment of less energy in the operation of that air compressor.

More particularly, the invention includes a dust collector comprising, in combination, a hopper, an exhaust chamber, a wall separating the hopper and the exhaust chamber, the wall including an opening, at least one hollow filter assembly comprising filter medium and having upper and lower ends, the upper end of the filter assembly registering with the wall opening, and the hopper being generally sealed from the exhaust chamber except through the wall opening and the filter medium of the filter assembly. Means are provided for supporting the filter assembly and for sealing the lower end of the filter assembly, the means comprising an end plate generally parallel to the wall and abutting the lower end of the filter assembly. The dust collector also includes means defining an inlet into the hopper for introducing contaminated air into the hopper so that the contaminated air is caused to flow to the exhaust chamber through the filter medium, and airborne contaminants are accumulated on the filter medium. Means are also provided for selectively directing a reverse pulse of air into the opening of the filter assembly from the exhaust chamber side thereof so that air enters the filter assembly and generates airflow through the filter medium in the reverse of the direction of contaminated airflow to thereby remove accumulated contaminants from the filter medium. The air pulse directing means includes nozzle means spaced above the wall opening and constructed to accelerate the air emitted toward the wall opening such that the air pulses are emitted from the nozzle means and propagate toward the wall opening in a cone-shaped pattern and enter the wall opening. The dust collector further includes a sleeve having upper and lower ends, and an outer surface, and being positioned inside the hollow filter assembly with the outer surface adjacent the filter medium, the upper end of the sleeve registering with the wall opening and the lower end of the sleeve opening into the filter assembly. The sleeve has a length such that the air pulses entering the wall opening and the upper end of the sleeve propagate downwardly through the sleeve into the filter assembly and do not impinge upon the filter medium.

In one embodiment, the sleeve has a length such that the air pulses exit the lower end of the sleeve at a speed of 150 to 250 feet per second.

In one embodiment, the nozzle means accelerates the air emitted toward the wall opening to supersonic velocity.

The invention also provides a method for improving the operation of a dust collector wherein the dust collector includes a hopper, an exhaust chamber, and a wall separating the hopper and the exhaust chamber, the wall including an opening. The dust collector also includes means for filtering contaminated air flowing through the opening from the hopper, the filtering means including a hollow filter assembly comprising filter medium and having upper and lower ends, the upper end of the filter assembly registering with the wall opening and the hopper being generally sealed from the exhaust chamber except through the wall opening and the filter medium of the filter assembly. The filtering means further includes means for supporting the filter assembly and for sealing the lower end of the filter assembly, the means comprising an end plate generally parallel to the wall and abutting the lower end of the filter assembly. Also provided are means defining an inlet into the hopper for introducing contaminated air into the hopper so that the contaminated air is caused to flow to the exhaust chamber through the filter medium, and airborne contaminants are accumulated on the filter medium. The dust collector further includes means for selectively directing reverse pulses of air into the wall opening from the exhaust chamber whereby the reverse air pulses enter the filter assembly and generate an airflow through the filter medium in the reverse of the direction of contaminated airflow to remove accumulated contaminants from the filter medium. The air pulse directing means includes a conduit in the exhaust chamber, means for supplying air under pressure to the conduit, and means for directing air from the conduit toward the wall opening such that the air pulses are emitted from the conduit, propagate toward the wall opening in a cone-shaped pattern, and enter the wall opening. The method for improving the operation of the dust collector comprises the step of: inserting a sleeve having upper and lower ends, and an outer surface, into the filter assembly such that the sleeve is positioned inside the hollow filter assembly with the outer surface adjacent the filter medium, with the upper end of the sleeve registering with the wall opening, and with the lower end of the sleeve opening into the filter assembly. The sleeve has a length such that the air pulses entering the wall opening and the upper end of the sleeve propagate downwardly through the sleeve into the filter assembly and do not impinge upon the filter medium.

In one embodiment, the method further comprises the step of providing a nozzle directing reverse pulses of air from the conduit toward the wall opening.

In one embodiment, the nozzle accelerates the air emitted toward the wall opening to supersonic velocity.

The invention also provides an apparatus for improving the operation of a dust collector such as the dust collector improved by the above-described method. The apparatus for improving the operation of a dust collector comprises a sleeve adapted to be inserted into the filter assembly of the dust collector, the sleeve having upper and lower ends, and an outer surface, and being positioned inside the hollow filter assembly with the outer surface adjacent the filter medium of the filter assembly, the upper end of the sleeve registering with the wall opening of the dust collector and the lower end of the sleeve opening into the filter assembly. The sleeve has a length such that the air pulses entering the wall opening propagate downwardly through the sleeve into the filter assembly and do not impinge upon tne filter medium.

In one embodiment, the apparatus further comprises a nozzle directing reverse pulses of air from the conduit toward the wall opening.

In one embodiment, the nozzle accelerates the air emitted toward the wall opening to supersonic velocity.

Various other features and advantages of the invention are set forth in the following description and claims and in the drawings.

BRIEF DESCRIPTION OF THE DRAWINGS

FIG. 1 is a partial schematic view of a dust collector embodying the invention.

FIG. 2 is an enlarged cross section elevation view of a portion of a conventional dust collector.

FIG. 3 is an enlarged cross section elevation view of a portion of a dust collector embodying the invention.

FIG. 4 is an enlarged perspective view of the supersonic discharge nozzle in FIG. 3 and shown with portions broken away.

Before describing a preferred embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENT

The invention provides a method and an apparatus for improving the operation of a conventional dust collector, the method being the insertion of the apparatus into a dust collector. A common type of dust collector to which this invention is particularly well suited is described below. The invention will be discussed as embodied in such a system, but it should be appreciated that the invention may have wider application than the one in which it will be discussed.

With reference to FIGS. 1 and 2, filter apparatus 10 is central to the overall dust collection system. It includes a dust collecting hopper 12 in which a series of elongated cylindrical filter assemblies 13 are suspended, in the manner to be described hereinafter. The apparatus also includes an exhaust or clean air chamber 14 (FIG. 2) above the hopper 12 and suspended filter assemblies 13. The hopper 12 and the exhaust chamber 14 are separated by a horizontal header plate 15. A plurality of openings 20 in the header plate 15 are arranged in a row and a plurality of such rows are arranged on the header plate 15. In this embodiment, the openings 20 are generally circular. A filter assembly 13 suspended in the hopper 12 registers with each opening 20. This arrangement is conventional and has not been illustrated in its entirety.

Contaminated air is introduced into the hopper 12 by means of side inlet 16 and duct work 17. The contaminated air can come from any source, for example, fume collector hoods 18 at a welding station or the like. Two such collector hoods are illustrated schematically in FIG. 1. Collector hoods 18 are located adjacent the welding area and conduits 19 connect those hoods to the duct work 17.

A conventional fan 21 is connected by duct work 22 to an outlet opening 23 in exhaust chamber 14. Fan 21 draws air from the exhaust chamber 14, thereby creating a pressure drop between exhaust chamber 14 and hopper 12 and causing a flow of contaminated air into the hopper 12 and through the filter assemblies 13 and openings 20 into the exhaust chamber 14.

An access door 24 is provided in hopper 12 for maintenance, such as replacement of the filter assemblies 13, and a discharge door 26 is provided at the bottom of the hopper 12 to permit the hopper 12 to be periodically emptied of dust and other contaminants which have collected in the hopper 12.

Turning now to FIG. 2, which shows the prior art, each filter assembly 13 (and only one will be described as the description applies to all) includes filter medium 27 made of a conventional material which is pervious to the air but not to airborne contaminants. The medium 27 is preferably cylindrical as illustrated. The filter medium 27 commonly comprises a fabric material and is supported by a cylindrical metal screen or mesh 28 which provides mechanical support for the medium but has a generally open construction so as not to interfere with airflow. Means are also provided for suspending the filter assemblies 13 from the header plate 15 which separates the exhaust or clean air chamber 14 from the lower or inlet chamber of the hopper 12. While various suspending means can be provided, in the construction illustrated the filter medium 27 and the metal screen 28 are supported by end plates 30, the plates 30 in turn supported by a tie rod 32 suspended from a supporting ring 34 surrounding the opening 20 and bearing against the upper surface of the header plate 15. The plates 30 supporting the filter assembly 13 also function to seal the lower end of the filter assembly 13.

As stated above, the filter medium 27 is impervious to airborne contaminants which, when their flow is interrupted by the filter medium 27, either adhere to the outer surface of the filter medium 27 or fall into the hopper 12. It is well known that the efficiency of the filter medium 27 improves as airborne contaminants are collected as a cake on the outer surface. However, it is also recognized that the thickness of that cake should be kept at an approximate minimum thickness and that excessive build-up should be avoided. Excessive build-up can substantially increase the pressure drop across the filter medium 27, thereby increasing the energy requirements for operation of the filter apparatus 10. In fact, build-up of excessive material on the filter medium 27 can reach the point where airflow through the filter apparatus 10 is virtually impossible. Accordingly, periodic cleaning of the filter assembly 13 to remove at least a portion of the accumulated cake of filtered material has been recognized as desirable and various arrangements have been proposed to achieve that cleaning.

The dust collector includes a means for periodically cleaning the accumulated cake material from the external surface of the filter assemblies 13. Such means includes a means for selectively directing reverse pulses of compressed air into the filter assemblies 13. The air pulses are reverse in the sense that they are in the direction opposite to the flow of air through the apparatus during a regular filtering cycle. In the prior art arrangements the compressed air jets are intended to periodically impinge against the inner surface of the filter medium 27 as a pulse to thereby cause removal of the cake of material. The pulse is of a short duration and it interrupts the filtering operation of the filter assemblies 13 for only a short period of time. The pulse of air is intended to dislodge the cake material from the external surface of the filter medium 27 of the filter assemblies 13 such that it can fall into the bottom of the hopper 12 where it can be removed. Additionally, the dust collector includes a means for directing a pulse of air against the internal surface of the filter assemblies 13 in such a manner that the air pulse will impinge against the entire surface of the filter medium 27 of the filter assembly 13.

Referring more particularly to the conventional means for directing a reverse pulse of air into the filter assemblies 13, in the construction illustrated in FIG. 2, that means includes a plurality of orifices 47 positioned above the filter assemblies 13 and adapted to direct air pulses downwardly in the direction of the openings 20 into the filter assemblies 13. The means for selectively directing pulses of air into the filter assemblies 13 also includes an air pressure source such as an air compressor 42 supplying air under pressure to a manifold 44, the manifold 44 being connected to air conduits 46 or purge pipes housed in the exhaust chamber 14 and supported by its upper wall 48. Valve means 50 are also provided for selectively providing pulses of compressed air from the air pressure source 42 to the manifold 44 and the conduits 46. The air conduits 46 each include a plurality of the orifices 47 on the downward side of the air conduit 46. The orifices 47 are positioned such that one orifice 47 is positioned over each of the filter assemblies 13.

One of the air conduits 46 and an associated orifice 47 are shown in FIG. 2. In the instant case, pulses of compressed air are conveyed by the conduits 46 in a controlled manner. Such pulses of compressed air cause airflow through the orifices 47. The air pulses so generated propagate downwardly across the exhaust chamber 14 and impinge against the inside surface of the filter medium 27 of the filter assemblies 13.

In operation, the pulse of air emitted by the orifice 47 propagates toward the opening 20 of the filter assembly in a cone-shaped pattern as shown in the dashed lines of FIG. 2. The orifice 47 is positioned above or in spaced relation from the opening 20 of the filter assembly 13 at a sufficient distance such that the base of the cone of the pulse of air emitted by the nozzle has a diameter approximating that of the opening 20. The air pulse is intended to impinge against the filter medium 27 at the upper end of the filter assembly 13 and is intended to propagate downwardly along the length of the filter assembly 13 thereby causing cake material on the outside of the filter medium 27 to be discharged and to fall into the lower portion of the hopper 12.

However, the air pulse may not propagate downwardly to clean the entire length of the filter assembly 13, and only a portion of the filter medium 27 will be cleaned.

In a properly functioning filter assembly 13, the air pulse propagates downwardly through the length of the filter assembly 13, the velocity of the air drops to zero, and velocity pressure converts to static pressure, thereby increasing the pressure inside the filter assembly 13. The pressure inside the filter assembly 13 continues to increase until it is great enough to blow the caked material off the entire surface area of the filter medium 27. Proper cleaning is *not* achieved by the air jet impinging directly on the filter medium 27 and thereby dislodging the cake.

If the air pulse impinges upon the filter medium 27, the result is that the air pulse dislodges the cake from the filter medium 27 only at the point of impingement. Air then escapes from the filter assembly 13 at that point, and the pressure in the filter assembly 13 never increases enough to blow the caked material off the remainder of the filter medium 27.

When the air pulses impinge only on the end plate 30, the cake is undisturbed and the air pressure in the filter assembly 13 increases until the pressure is great enough to blow the caked material off the entire area of the filter medium 27.

As the air pulse leaves the orifice 47, the air pulse grows by inducing the surrounding air (hence the cone-shaped pattern). Obeying the law of momentum, as the mass of the air in the pulse grows, the velocity decreases. The velocity of the air pulse also decreases due to resistance from the static air in the exhaust chamber 14 and in the filter assembly 13. When the pulse enters the filter assembly 13 through the opening 20, the pulse propagates straight downward such that it does not impinge on the filter medium 27. The pulse causes air to be sucked into the filter assembly 13 through any open areas in the filter medium 27 where contaminants have not become caked. This air sucked in through the filter medium 27 has two effects.

First, it causes the air pulse to grow in diameter, and if the growth is sufficient, the air pulse will impinge upon the filter medium 27. This impingement is undesirable for the reasons discussed above.

Second, the air sucked in through the filter medium 27 by the air pulse causes the contaminants caught in the filter medium 27 to become more tightly packed into the filter medium 27. If too much air is sucked in through the filter medium 27, this packing makes the caked material virtually impossible to dislodge.

The rate of air sucked in through open areas in the filter medium 27 and the consequent growth of the air pulse and packing of the cake is a function of the velocity of the air pulse and the amount of open area. As the velocity of the air pulse increases, the amount of air entering through the open areas to join the air of the pulse also increases. With conventional filter assemblies 13 and filter media 27, the amount of open area is fairly constant, so that the rate of air entering through open areas in the filter medium 27 can be controlled by controlling the velocity of the air entering the filter assembly 13.

In a typical dust collector, the air pulse enters the opening 20 at a velocity which is too high, causing an undue amount of air to flow through the open areas into the air pulse. The air pulse grows until it impinges upon the filter medium 27, and inefficient cleaning results. The key to efficient cleaning is having the air pulse enter the filter assembly 13 at the proper velocity.

As the pulse propagates downwardly, it grows by inducing air, and its velocity decreases, due to the increased mass of the air pulse and due to the resistance from static air. The velocity of the air pulse then is a function of the distance the pulse has traveled from the orifice 47 and of the velocity of the pulse as it exits the orifice 47. This exit velocity is constant with any given dust collector, so the velocity of the air pulse is a function of the distance traveled, the velocity decreasing as the distance increases. Therefore, to cause the air pulse to enter the filter assembly 13 at the proper velocity for efficient cleaning, the distance the pulse travels before entering the filter assembly 13 must be sufficiently great.

The invention provides a method and apparatus for improving the operation of a prior art dust collector such as described above. This apparatus essentially extends the distance from the orifice 47 to entry of the filter assembly 13, so that the air pulse enters the filter assembly 13 at the proper velocity for efficient cleaning.

This apparatus is a sleeve 60 having upper and lower ends and an outer surface. The sleeve 60 is positioned with the upper end of the sleeve 60 registering with the wall opening 20 and with the sleeve 60 extending downwardly into the hollow filter assembly 13, as shown in FIG. 3, with the outer surface of the sleeve 60 adjacent the filter medium 27. The lower end of the sleeve 60 opens into the filter assembly 13. The sleeve 60 is positioned such that the air pulse does not enter the filter assembly 13 until it has passed through the sleeve 60. The air pulse enters the opening 20, and exits the lower end of the sleeve 60 into the filter assembly 13.

A portion of an improved dust collector, including a sleeve 60, is shown in FIG. 3. Also shown in FIG. 3 are means for mounting the sleeve 60 inside the opening 20. While various suitable means could be employed for this purpose, in the construction illustrated, the means includes a flange 61 extending outwardly from and perpendicular to the outer surface of the upper end of the sleeve 60. The lower surface of the flange 61 abuts against the upper surface of the header plate 15 around the opening 20, so that the sleeve 60 is suspended inside the opening 20. The supporting ring 34 for the tie rod 32 then bears against the upper surface of the flange 61, instead of against the upper surface of the header plate 15.

In a preferred form of the invention, a supersonic nozzle 40 is also provided for directing reverse pulses of air from the conduit 46 toward the opening 20. Installation of supersonic nozzles 40 may also require removal and machining of or replacement of the air conduits 46, in order to accommodate the supersonic nozzles 40. The dust collector shown in FIG. 3 includes a reshaped air conduit 46A.

It should also be understood that alternative embodiments wherein nozzles are installed need not employ supersonic nozzles. However, the use of supersonic nozzles provides maximum efficiency of operation of the air compressor 42, providing better energy conversion. The cleaning effect of an air pulse is a function of the amount of air pumped into the filter assembly 13. Cleaning can be increased by increasing the mass of the air entering the filter assembly 13. By increasing the velocity of air flowing through the nozzles 40 to a supersonic speed, the amount of air pumped into the filter assembly 13 can be increased without increasing the quantity or mass of air flowing through the nozzle 40. As the velocity of the air pulse increases, more air is induced into the mass of air forming the air pulse, thereby increasing the mass of air entering the filter assembly 13. Therefore, the supersonic nozzle 40 requires less compressed air to fill the filter assembly 13. Increasing the amount of air flowing through the nozzle 40 would require an increase in the size of the air compressor 42 and would decrease the efficiency of operation of the dust collector.

One of the reshaped air conduits 46A and an associated nozzle 40 are shown in FIG. 4. Generally the nozzles 40 are shaped such that the air flowing from the conduits 46A and through the nozzles 40 toward the opening of the filter assemblies 13 will reach supersonic velocity at the downward or discharge end 54 of the nozzles 40. As is well known to those skilled in the art, by providing a nozzle 40 having a properly contoured converging portion 56 and diverging portion 58 such as that shown in FIG. 4, when the air in the conduit 46A and adjacent the upstream end or converging end 56 of the nozzle 40 is at a sufficiently elevated pressure, the velocity of the air flowing through the downstream end or diverging end 58 of the nozzle 40 can be elevated to a supersonic speed. In the instant case pulses of compressed air are conveyed by the conduits 46 in a controlled manner. Such pulses of compressed air cause airflow through the nozzles 40, and the air pulses being discharged by the nozzles 40 reach supersonic velocity at the discharge end 54 of the nozzles 40.

The operation of the sleeve 60 will be described as in a dust collector including supersonic nozzles 40, as this is the most efficient dust collector contemplated by the invention.

The critical dimension in the filter apparatus 10 is the distance from the discharge end 54 of the nozzle 40 to the lower end of the sleeve 60, as increasing this distance decreases the velocity of the air pulse at the point where it enters the filter assembly 13. By varying the length of the sleeve 60, the velocity of the air jet entering the filter assembly 13 can be controlled, and proper velocity can be achieved.

In a dust collector employing a sleeve 60 of proper length, as shown in FIG. 3, the jet enters the filter assembly 13 at a velocity which is sufficiently low, and it does not grow so as to impinge upon the filter medium 27. Instead, it propagates downwardly until it reaches zero velocity, whereupon the air expands, and the increased pressure blows the cake off the filter medium 27.

The air pulse entering the sleeve 60 also serves to seal the opening 20 so that air entering the filter assembly 13 from the nozzle 40 cannot escape through the opening 20. If air escapes upwardly through the opening 20, the pressure in the filter assembly 13 cannot become great enough to dislodge the cake from the filter medium 27. If the cone of air seals the opening 20, the pressure in the filter assembly 13 builds until the air is forced out through the filter medium 27, thereby dislodging the cake.

It has been found in the case of conventional filter assemblies 13 that an air jet speed of 150 to 250 feet per second when entering the filter assembly 13 is optimal for preventing the air jet from growing so as to impinge upon the filter medium 27, and for preventing packing of the cake. Therefore, in the embodiment illustrated in FIG. 2, the length of the sleeve 60 is such that the air pulses exit the lower end of the sleeve 60 at a speed of 150 to 250 feet per second. In alternative embodiments, employing filter assemblies having qualities differing from those of the conventional filter assemblies just mentioned, the air pulses could enter the filter assembly 13 at other speeds.

Various features of the invention are set forth in the following claims.

I claim:
1. A dust collector comprising, in combination,
a hopper,
an exhaust chamber,
a wall separating said hopper and said exhaust chamber, said wall including an opening having a diameter,
means for filtering contaminated air flowing through said opening from said hopper, said filtering means including a hollow fitler assembly comprising filter medium and having upper and lower ends, said upper end of said filter assembly registering with said wall opening, said hopper being generally sealed from said exhaust chamber except through said wall opening and said filter medium of said filter assembly, and said filtering means further including means for supporting said filter assembly and for sealing said lower end of said filter assembly, said supporting and sealing means copmrising an end plate generally parallel to said wall and at said lower end of said filter assembly,
means defining an inlet into said hopper for introducing contaminated air into said hopper so that said contaminated air is caused to flow to said exhaust chamber through said filter medium and airborne contaminants are accumulated on said filter medium,
means for selectively directing reverse pulses of air into said wall opening from said exhaust chamber whereby said reverse air pulses enter said filter assembly and generate airflow through said filter medium in the reverse of the direction of contaminated airflow to remove accumulated contaminants from said filter medium, said air pulse directing means including nozzle means spaced above said wall opening, said nozzle means being constructred to accelerate the air emitted toward said wall opening such that said air pulses are emitted from said nozzle means and propagate toward said wall opening in a cone-shaped pattern and enter said wall opening, and
means for reducing the velocity of said reverse air pulses and for preventing said reverse air pulses from impinging upon said filter medium as said reverse air pulses propagate to said lower end of said hollow filter assembly, said reducing and preventing means including an air impermeable sleeve having upper and lower ends, an outer surface and an inner cylindrical surface, and an outside diameter substantially equal to said diameter of said wall opening, said sleeve being positioned inside said hollow filter assembly with said outer surface closely adjacent but spaced from said filter medium, and with said upper end of said sleeve registering with said wall opening and said lower end of said sleeve opening into said filter assembly, said sleeve extending into said filter assembly a substantial distance and with the lower end thereof being spaced from said nozzle means a preselected distance to insure that air pulse cone-shaped pattern impinges on said inner surface of said sleeve, said preselected distance also being such that the velocity of said air pulses emitted from said lower end of said sleeve is reduced sufficiently as compared to the velocity of said air pulses at said opening so that said air pulses emitted from said lower end of said sleeve do not grow by drawing air through said filter medium so as to impinge upon said filter medium as said air pulses propagate from said lower end of said sleeve to said lower end of said hollow filter assembly but impinge directly on said end plate.

2. A dust collector as set forth in claim 1 wherein said air pulses exit said lower end of said sleeve at a speed of 150 to 250 feet per second.

3. A dust collector as set forth in claim 1 wherein said means for directing a reverse pulse of air includes a conduit in said exhaust chamber and means for supplying air under pressure to said conduit, and wherein said nozzle is supported by said conduit and directs air from said conduit toward said opening.

4. A dust collector as set forth in claim 1 wherein said nozzle means accelerates the air emitted toward said wall opening to supersonic velocity.

5. A dust collector as set forth in claim 4 wherein said air pulses exit said lower end of said sleeve at a speed of 150 to 250 feet per second.

* * * * *